United States Patent
Nakatani et al.

(10) Patent No.: US 8,262,484 B2
(45) Date of Patent: Sep. 11, 2012

(54) TELESCOPIC SHAFT FOR VEHICLE STEERING SHAFT AND GREASE COMPOSITION FOR LUBRICATING TELESCOPIC SHAFT

(75) Inventors: Shinya Nakatani, Fujisawa (JP); Atsushi Yokouchi, Fujisawa (JP); Hiroshi Sato, Maebashi (JP); Kazunori Takahashi, Maebashi (JP); Yoshinori Takahashi, legal representative, Maebashi (JP); Seiichi Moriyama, Maebashi (JP)

(73) Assignee: NSK Ltd., Tokyo (JP)

( * ) Notice: Subject to any disclaimer, the term of this patent is extended or adjusted under 35 U.S.C. 154(b) by 679 days.

(21) Appl. No.: 12/097,241

(22) PCT Filed: Dec. 13, 2006

(86) PCT No.: PCT/JP2006/324872
§ 371 (c)(1),
(2), (4) Date: Aug. 4, 2009

(87) PCT Pub. No.: WO2007/069659
PCT Pub. Date: Jun. 21, 2007

(65) Prior Publication Data
US 2010/0132499 A1    Jun. 3, 2010

(30) Foreign Application Priority Data
Dec. 13, 2005  (JP) .................... PCT/JP2005/022889

(51) Int. Cl.
*F16C 1/24*    (2006.01)

(52) U.S. Cl. .......................................... 464/16; 508/519
(58) Field of Classification Search ................ 464/7, 15, 464/16; 508/110, 519
See application file for complete search history.

(56) References Cited

U.S. PATENT DOCUMENTS

| 2004/0092408 A1 | 5/2004 | Willey et al. |
| 2004/0242334 A1 * | 12/2004 | Hamakita et al. ................. 464/7 |

FOREIGN PATENT DOCUMENTS

| GB | 2185492 A | 7/1987 |
| JP | 5-7224 B2 | 1/1993 |
| JP | 7-34083 A | 2/1995 |
| JP | 7138587 A | 5/1995 |
| JP | 7-49073 Y2 | 11/1995 |
| JP | 9169988 A | 6/1997 |

(Continued)

OTHER PUBLICATIONS

Wagner, P. E., "Splines and Axial Motion Devices" Universal Joint and Driveshaft Design Manual, AE-7, Society of Automotive Engineers, Inc., Warendale, PA, pp. 185-198, TJ1079.SW62 1979.*

(Continued)

*Primary Examiner* — Gregory Binda
(74) *Attorney, Agent, or Firm* — Sughrue Mion, PLLC

(57) ABSTRACT

A telescopic shaft for vehicle steering installed in a vehicle steering shaft. A male shaft and a female shaft are non-rotatably and slidably fitted to each other and an outer peripheral portion of the male shaft and an inner peripheral portion of the female shaft come in contact with each other to transmit a torque during rotation. A grease composition which has an apparent viscosity of 400 to 750 Pa·s (25° C.) at a shear rate of 10 sec$^{-1}$ as defined in JIS K2220 is enclosed in a gap between the outer peripheral portion of the male shaft and the inner peripheral portion of the female shaft.

4 Claims, 5 Drawing Sheets

FOREIGN PATENT DOCUMENTS

| | | |
|---|---|---|
| JP | 11-152490 A | 6/1999 |
| JP | 11-208484 A | 8/1999 |
| JP | 2000-74081 A | 3/2000 |
| JP | 2003-54421 A | 2/2003 |
| JP | 200396480 A | 4/2003 |
| JP | 2003226244 A | 8/2003 |
| JP | 200466970 A | 3/2004 |
| JP | 2004-245372 A | 9/2004 |
| JP | 200596541 A | 4/2005 |
| JP | 2005153677 A | 6/2005 |
| JP | 2005213330 A | 8/2005 |
| JP | 2005-329849 A | 12/2005 |
| JP | 2006-90430 A | 4/2006 |
| JP | 2006-123820 A | 5/2006 |
| JP | 2006274036 A | 10/2006 |
| JP | 2006-300260 A | 11/2006 |
| WO | 2004/081156 A1 | 9/2004 |
| WO | 2006/070893 A1 | 7/2006 |
| WO | WO 2006090641 A1 | 8/2006 |

OTHER PUBLICATIONS

"Chevron SRI Grease" [online] Chevron Proiducts Company, San Ramon, CA, Nov. 20, 2008 [retrieved on Aug. 31, 2011]. Retrieved from the Internet: URL: http://www.alexisoil.com.*

"Apparent Viscosity of Grease" [online] Engineers Edge, LLC, 2000 [retrieved on Aug. 31, 2011] Retrieved from the Internet: URL: http://www.engineersedge.com/lubrication/apparent$_{13}$ viscosity_grease.htm.*

"Viscosity Converting Table" [online] The Engineering Toolbox [retrieved on Aug. 31, 2011] Retrieved from the Internet: URL: http://www.engineeringtoolbox.com/viscosity-convereter-d_413.html.*

JIS K2220 as filed by the inventor Jan. 6, 2011.*

Extended European Search Report issued Mar. 4, 2011 in counterpart European Application No. 06834627.9.

Communication dated Nov. 15, 2011 from the Japanese Patent Office in counterpart Japanese application No. 2007-550206.

* cited by examiner

US 8,262,484 B2

TELESCOPIC SHAFT FOR VEHICLE STEERING SHAFT AND GREASE COMPOSITION FOR LUBRICATING TELESCOPIC SHAFT

TECHNICAL FIELD

The present invention relates to a telescopic shaft for vehicle steering (hereinafter, simply referred to as "telescopic shaft"), which is installed in a vehicle steering shaft and a grease composition for lubricating the telescopic shaft.

BACKGROUND ART

Conventionally, in a vehicle control mechanism, a telescopic shaft in which a male shaft and a female shaft are in spline-fitting has been used as a part of a steering mechanism in order to absorb axial direction displacement which is generated during running of a vehicle and not to propagate the displacement or vibration onto a steering wheel. FIG. 1 is a side view illustrating an example thereof. In the figure, reference symbols "a" and "b" denote telescopic shafts. In the telescopic shaft a, a male shaft and a female shaft are in spline-fitting. The telescopic shaft a is required to have an ability of absorbing the axial direction displacement which is generated during running of the vehicle and of not propagating the displacement or the vibration onto the steering wheel. Such an ability is usually required when the vehicle body is in a sub-frame structure in which a portion "c" for fixing an upper part of the steering mechanism and a frame "e" to which a steering rack "d" is fixed are separately provided and both members are fastened and fixed through an elastic member "f" such as rubber interposed therebetween. There is also another case in which a telescopic function is required for an operator, when fastening a steering shaft joint "g" to a pinion shaft "h", to temporarily contract the telescopic shaft to then fit and fasten it to the pinion shaft "h". Further, the telescopic shaft b in an upper part of the steering mechanism also has the male shaft and the female shaft being in spline fitting. This telescopic shaft b is required to have a function of extending and contracting in the axial direction since it is required to have a function of moving a steering wheel "I" in the axial direction to adjust the position thereof in order to obtain an optimal position for a driver for driving the vehicle. In all the cases described above, the telescopic shaft is required to reduce rotational looseness noise in a spline portion, to reduce a rotational looseness feeling on the steering wheel and to reduce a sliding resistance during a sliding movement in the axial direction.

On that account, in conventional cases, metallic noise, metallic rattling noise, or the like has been absorbed or reduced and the sliding resistance and the looseness in a rotation direction have been reduced by applying a nylon coating to a spline portion of the male shaft and applying grease to a sliding portion. Further, since a complicated process or advanced finishing is necessary to apply the nylon coating, forming a polytetrafluoroethylene coating which has proper elasticity and is excellent in lubricating property or wearing resistance has been proposed (see Patent Document 1 for reference). Moreover, instead of the nylon coating, a resin sliding sleeve has been interposed between the male shaft and the female shaft to reduce the sliding resistance and to prevent the rotational looseness from occurring (see Patent Documents 2 to 4 for reference). In addition, it has been proposed that a recess portion for storing the grease is formed in a center part of a tooth tip surface or a tooth bottom surface of at least one of the male shaft and the female shaft to facilitate the supply and holding of the grease (see Patent Document 5 for reference), or that at least a circumferential direction end portion of the tooth tip of a female spline tooth is processed into an arc shape and covered with a mold release agent and the telescopic shaft in which a gap between the male shaft and the female shaft is filled with a resin is sealed (see Patent Document 6 for reference).

Patent Document 1: JP-A-2003-54421;
Patent Document 2: JP-B-5-7224;
Patent Document 3: JP-A-11-208484;
Patent Document 4: JP-A-2000-74081;
Patent Document 5: JP-A-2004-245372; and
Patent Document 6: JP-UM-B-7-49073.

DISCLOSURE OF THE INVENTION

Problem that the Invention is to Solve

The above-described measures are useful for each performance improvement, such as improvement in durability, reduction of sliding resistance, or stick-slip resistance, but can not improve all of the performances at the same time. Particularly, the durability and stick-slip resistance tend to be in inverse proportion to slidability.

Further, even when a polytetrafluoroethylene coating is formed or a sliding sleeve is interposed, the wearing resulting from the sliding is not avoided and the durability needs to be further improved. In addition, the sliding sleeve is required to be molded into a complicated shape so as to follow the contours of the male shaft and female shaft and to be processed with a high accuracy. Since another measure is also required to have a new process of molding the tooth tip surface or the tooth bottom surface of the male shaft or the female shaft into a specific shape, increase of manufacturing cost can not be avoided.

The invention is contrived to solve the problems and an object of the invention is to provide a telescopic shaft which is improved in all of durability, reduction of resistance and stick-slip resistance by improving grease for sealing, without a new process for a male shaft or a female shaft which is a cause of increase of cost.

Means for Solving the Problem

In order to achieve the object, the invention provides a telescopic shaft for vehicle steering and a grease composition for lubricating the telescopic shaft as follows.

(1) A telescopic shaft for vehicle steering which is installed in a vehicle steering shaft and in which a male shaft and a female shaft are non-rotatably and slidably fitted to each other and an outer peripheral portion of the male shaft and an inner peripheral portion of the female shaft come in contact with each other to transmit a torque during rotation, wherein a grease composition which has an apparent viscosity of 400 Pa·s to 750 Pa·s (25° C.) at a shear rate of 10 sec$^{-1}$ as defined in JIS (Japanese Industrial Standard) K2220 is enclosed in a gap between the outer peripheral portion of the male shaft and the inner peripheral portion of the female shaft.

(2) The telescopic shaft for vehicle steering according to (1), wherein a resin coating is formed on at least a part of a sliding surface of at least one of the male shaft and the female shaft.

(3) The telescopic shaft for vehicle steering according to (1) or (2), wherein a kinetic viscosity of a base oil of the grease composition is ranging from 200 mm²/s to 1100 mm²/s (40° C.)

(4) The telescopic shaft for vehicle steering according to any one of (1) to (3), wherein the content of a thickener of the grease composition is ranging from 5 mass % to 35 mass % relative to a total amount of the grease.

(5) A grease composition which is enclosed in a gap between an outer peripheral portion of a male shaft and an inner peripheral portion of a female shaft of a telescopic shaft for vehicle steering which is installed in a vehicle steering shaft and in which the male shaft and the female shaft are non-rotatably and slidably fitted to each other and the outer peripheral portion of the male shaft and the inner peripheral portion of the female shaft come in contact with each other to transmit a torque during rotation, wherein in a base oil which has a kinetic viscosity of 200 mm²/s to 1100 mm²/s at 40° C., a thickener is mixed at a ratio of 5 mass % to 35 mass % relative to a total amount of the grease and an apparent viscosity is ranging from 400 Pa·s to 750 Pa·s (25° C.) at a shear rate of 10 sec$^{-1}$ as defined in JIS K2220.

Advantage of the Invention

Although a substantially easy method such as the enclosing of a grease composition having a specific viscosity, a telescopic shaft for vehicle steering according to the invention achieves reduction of resistance or wearing property and a stable sliding load more excellently. Further, occurrence of stick-slip can be suppressed and a steering feeling can be properly maintained for a long period of time. Particularly, the telescopic shaft for vehicle steering according to the invention can be used as an output shaft for a hydraulic or pinion rack type electric power steering in which a torque of about 30 N·m or less is input and also for a column type electric power steering in which a torque of about 100 N·m is input.

Figure 1:
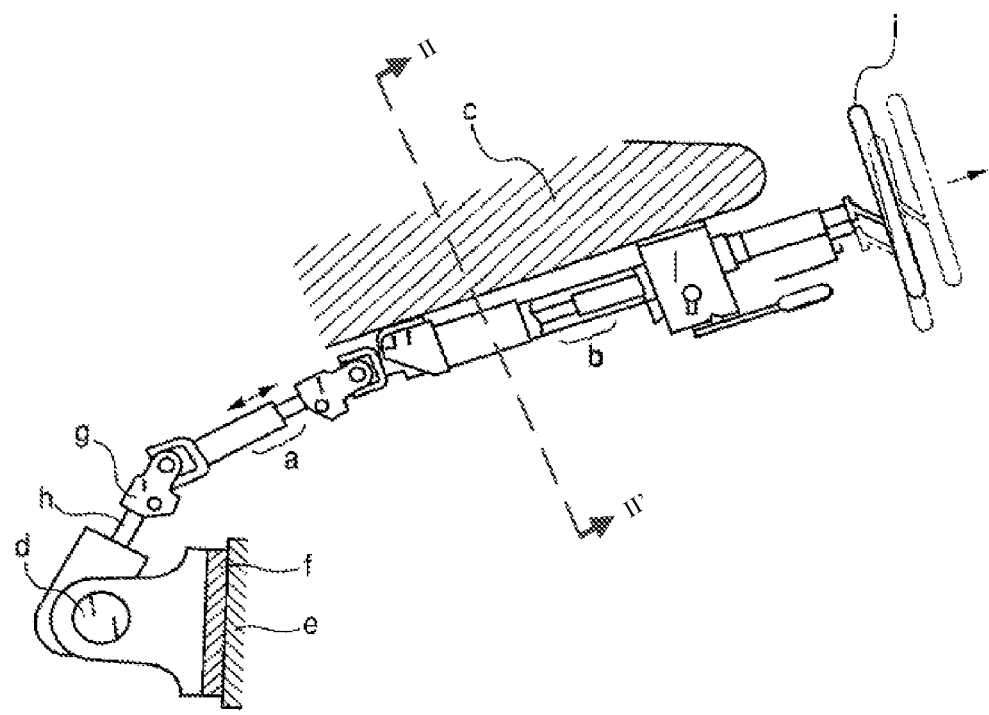
FIG. 1 is a side view of a steering mechanism of a vehicle in which a telescopic shaft is installed.

| Description of Reference Numerals and Signs | |
|---|---|
| a, b: | TELESCOPIC SHAFT |
| 1: | MALE SHAFT |
| 2: | FEMALE SHAFT |
| 10: | RESIN COATING |

BEST MODE FOR CARRYING OUT THE INVENTION

Hereinafter, the invention will be described in detail with reference to the drawings.

According to the invention, a configuration of a telescopic shaft itself is not limited and can be exemplified by the telescopic shafts "a" and "b" illustrated in FIG. 1. In addition, the configuration of the telescopic shaft may be a configuration in which so-called male and female shafts can be extended and contracted in a axial direction and are fitted each other to transmit a torque in a circumferential direction, as well as a configuration such as spline-fitting or serration-fitting in which concavities and convexities are engaged with each other. Further, the configuration of the telescopic shaft also may be a configuration in which a ball, a skid, a needle, or the like are interposed between the male shaft and the female shaft. Materials for the male shaft and the female shaft may be the same with each other or different from each other and steel materials such as a SC material, a SUS material (defined in JIS) and bearing steel can be preferably used. Particularly, in view of cost, it is preferable to use the SC material such as S35C. In addition, it is preferable that these steel materials are subjected to a finishing process or a heat treatment. If necessary, it is preferable that the steel materials are subjected to a surface process such as a rust prevention process or a shot peening process.

As for a steering shaft, it is preferable that spline modules are 1.667 and 1.0 and the numbers of teeth are 10 and 18 for a typical shape.

Figure 2:
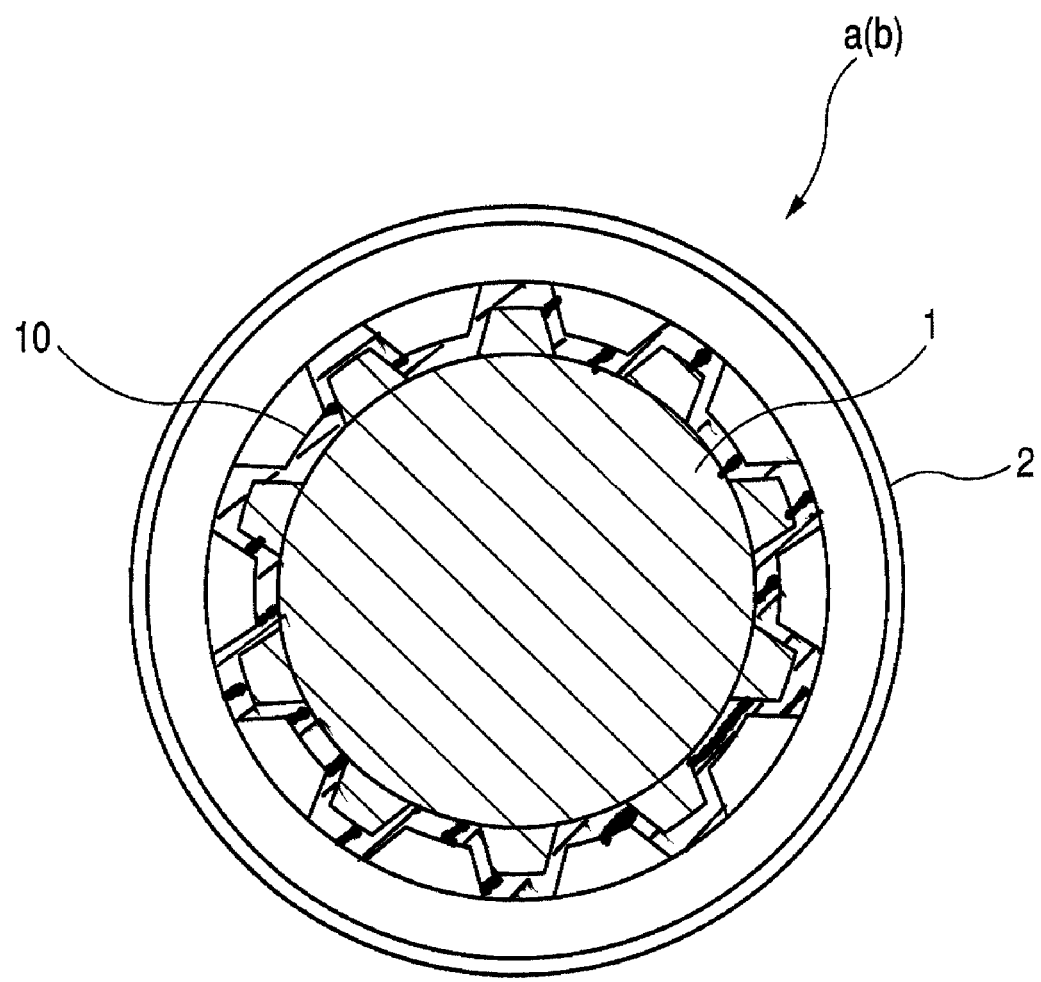
FIG. 2 is a cross-section view taken along line II-II' of the telescopic shaft.

As illustrated in the cross-section view of FIG. 2, in the telescopic shafts a and b, a female shaft 2 is slidably disposed with respect to the outer side of a male shaft 1. On at least one of an outer peripheral surface of the male shaft 1 and an inner peripheral surface of the female shaft 2, a resin coating 10 made of nylon or polytetrafluoroethylene, polyolefin sulfide, polyacetal, polyether ether ketone, polyamide, polyurethane, epoxy, silicone, acyl, phenol, polyethylene terephthalate, a liquid crystalline polymer, polyolefin, or a copolymer thereof can be formed. Among them, it is preferable to use a polyamide base material such as nylon 6, nylon 66, nylon 11, nylon 12, nylon 610, nylon 612, or nylon 6T. According to the synergy effect between the resin coating 10 and a grease composition to be described later, the reduction of a sliding force or the prevention of the rattling in a rotation direction becomes more effective. The thickness of the resin coating 10 can be properly set in accordance with a gap size and it is preferable to set the thickness in the range of 0.1 mm to 0.8 mm. Further, the resin coating 10 is formed by a known method. It is preferable to use a method including the steps of performing electrostatic coating (melting, solution, powder) or applying a solution containing a resin or a dispersion by spraying or dipping and of performing heating and drying. A fluidization dipping method also may be used.

Instead of the resin coating 10, the same synergy effect can be obtained by using a resin sleeve. A solid lubricant coating of molybdenum disulfide, tungsten disulfide, or the like, or a soft metal coating of tin, zinc, gold, or the like also may be used. The thickness of the solid lubricant coating or the soft metal coating also can be properly set in accordance with the gap size and it is preferable to set the thickness in the range of 1 µm to 100 µm. These coatings also can be formed by a known method and a resin binder or the like can be used.

Figure 8:
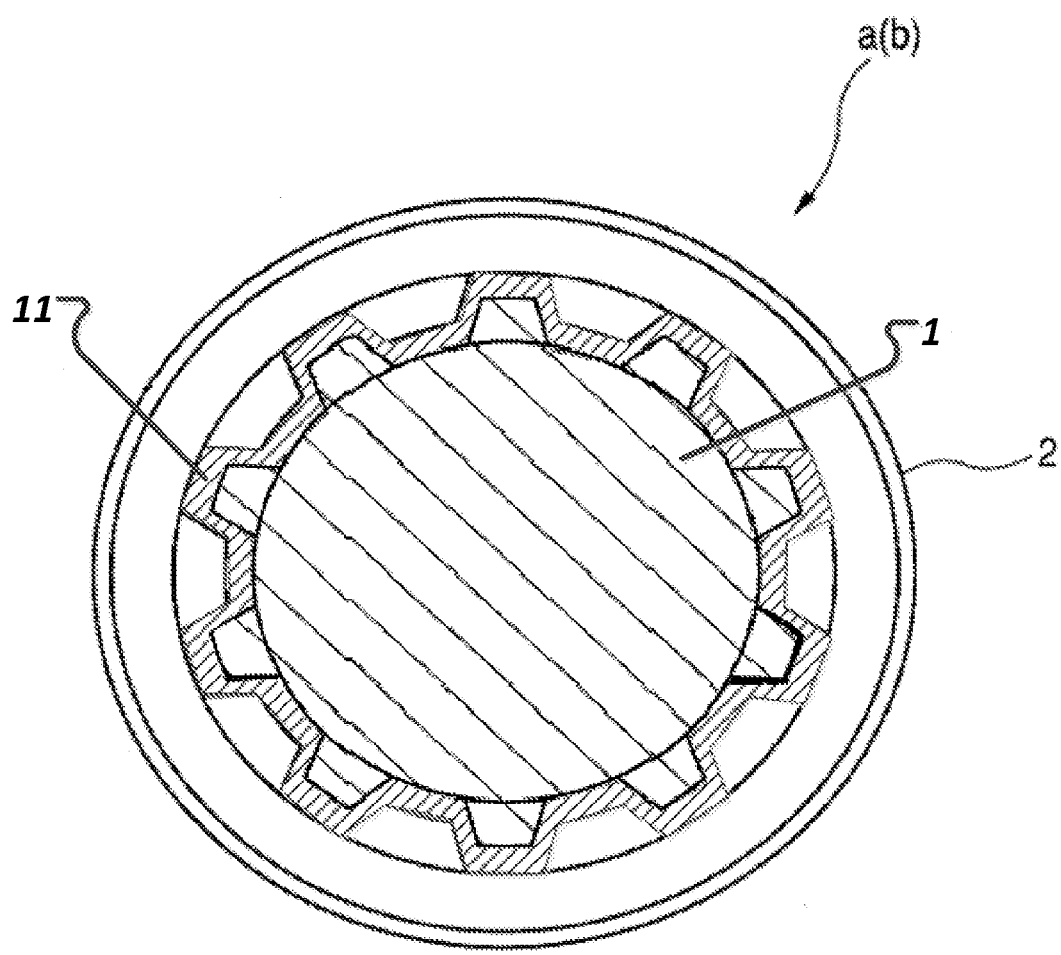
FIG. 8 is a cross-section view taken along line II-II' of the telescoping shaft in an alternative embodiment.

A grease composition 11 (FIG. 8) which has an apparent viscosity of 400 Pa·s to 750 Pa·s as measured at a shear rate of 10 sec$^{-1}$ and a temperature of 25° C. in accordance with JIS K2220 is enclosed in a gap between a male shaft 1 and a female shaft 2, which are configured in the same manner as described above. If the apparent viscosity is set in such specific range, more excellent suppression of stick-slip can be achieved in addition to reduction of resistance. It is more preferable that the apparent viscosity is ranging from 400 Pa·s to 600 Pa·s (25° C.) and it is even more preferable that the apparent viscosity is ranging from 450 Pa·s to 550 Pa·s (25° C.)

The kind of a base oil of the grease composition is not limited, however, it is preferable to use a mineral lubricating oil and a synthetic lubricating oil. The mineral lubricating oil is not limited, however, it is possible to use, for example, a paraffinic mineral oil, a naphthenic mineral oil and a mixture oil thereof. Particularly, it is preferable that the mineral lubricating oil is purified by properly combining vacuum distillation, solvent pitch removing, solvent extraction, hydrogenolysis, solvent dewaxing, sulfuric acid cleaning, clay refining and hydrogenation refining. In addition, the synthetic lubricating oil is also not limited, however, it is possible to use, for example, a synthetic hydrocarbon oil, an ethereal oil, an ester oil, a silicone oil and a fluorine oil. Specifically, the synthetic hydrocarbon oil is exemplified by a poly α-olefin oil, or the like, the ethereal oil is exemplified by a dialkyldiphenyl ether oil, an alkyltriphenyl ether oil, an alkyltetraphenyl ether oil, or the like and the ester oil is exemplified by a diester oil, a neopentyl-type polyol ester oil, a complex ester oil thereof, an aromatic ester oil, or the like. These lubricating oils may be used alone, or in proper combination of more than one kind thereof.

Further, it is preferable that a kinetic viscosity of the base oil is ranging from 200 $mm^2/s$ to 1100 $mm^2/s$ at 40° C. In the case in which the kinetic viscosity of the base oil is less than 200 $mm^2/s$ (40° C.), the effect of suppressing the stick-slip is not obtained and in the case in which the kinetic viscosity of the base oil is more than 1100 $mm^2/s$ (40° C.), it is difficult to enclose the base oil in the sliding-contacting portion and the sliding force between the outer peripheral portion of the male shaft and the inner peripheral portion of the female shaft increases. In view of the cases, it is more preferable that the kinetic viscosity of the base oil is ranging from 200 $mm^2/s$ to 400 $mm^2/s$ (40° C.) and it is even more preferable that the kinetic viscosity of the base oil is ranging from 200 $mm^2/s$ to 300 $mm^2/s$ (40° C.)

It is preferable that the base oil includes a polymer. Examples of the polymer include polyisobutylene, an olefin copolymer (COP), a star polymer (having a configuration in which a plurality of legs of polyisoplene radially extends from a core of polyvinylbenzene) and a butanol ester polymer of α-olefin and dicarboxylic acid copolymer, as well as an acrylic polymer such as polymethacrylate (PMA), polyacrylate, polyalkylmethacrylate (PAM), or the like. Particularly, it is preferable to use an acrylic polymer among them and it is more preferable to use PMA having 20,000 to 1,500,000 of a weight-average molecular weight Mw. The reason that the weight-average molecular weight Mw of PMA is set in this range is as follows. That is, in the case in which the weight-average molecular weight Mw of PMA is less than 20,000, a solubility with respect to the base oil is too high. On the other hand, in the case in which the weight-average molecular weight Mw of PMA is more than 1,500,000, the solubility with respect to the base oil is too low. Further, in order to stably exhibit the effect of reducing the friction in a wide temperature range, it is preferable that the weight-average molecular weight Mw of PMA is ranging from 500,000 to 1,500,000.

A thickener is not particularly limited and various kinds thereof can be used, if it serves to solidify the base oil into a semisolid or solid state. Examples of the thickener include metallic soap such as lithium-based soap, calcium-based soap, sodium-based soap, aluminum-based soap, lithium complex-based soap, calcium complex-based soap, sodium complex-based soap, barium complex-based soap, aluminum complex-based soap and the like, an inorganic compound such as bentonite, clay and the like and an organic compound such as a monourea-based, diurea-based, triurea-based, tetraurea-based, urethane-based, sodium terephthalamate-based, or fluorine resin-based compound and the like. These thickeners may be used alone, or in combination of two or more kinds thereof. Among them, it is preferable to use lithium-based soap or lithium complex-based soap, since penetration change over a temperature range from a low temperature to a high temperature is small or an amount of the thickener for obtaining a predetermined penetration is small. Particularly, among lithium-based soap and lithium complex-based soap, it is preferable to use lithium stearate and 12-hydroxy lithium stearate and it is more preferable to use 12-hydroxy lithium stearate.

It is preferable that the content of the thickener is ranging from 5 mass % to 35 mass % relative to the total amount of the grease. When the content of the thickener is less than 5 mass %, it is difficult to maintain the state of the grease and when the content of the thickener is more than 35 mass %, the sufficient lubricating state is not obtained due to the increased hardness. In view of this, it is more preferable that the content of the thickener is ranging from 10 mass % to 25 mass % relative to the total amount of the grease and it is even more preferable that the content of the thickener is ranging from 10 mass % to 20 mass %. Particularly, when the content of the thickener is ranging from 12 mass % to 18 mass %, a protective coating-forming ability and a penetration property into the sliding portion can be balanced with each other and the stick-slip phenomenon can be more suppressed.

It is preferable that worked penetration of the grease composition is ranging from 200 to 350, it is more preferable that the worked penetration of the grease composition is ranging from 240 to 310 and it is even more preferable that the worked penetration of the grease composition is ranging from 265 to 295.

If necessary, the grease composition can contain additives which are generally added to the grease, such as a extreme pressure agent, an antioxidant, a corrosion inhibitor, an anti-corrosive and the like. It is preferable that the total amount of the additives is equal to or less than 10 mass % relative to the total amount of the grease.

The grease composition according to the invention allows improvement in durability, reduction of resistance and stick-slip resistance without using a solid lubricant such as molybdenum-disulfide (black color) affecting the color of the grease or an extreme-pressure agent such as an organic molybdenum-based extreme-pressure agent (violet color to brown color). There are some cases in which the grease having black to dark colors gives an unpleasant feeling to an operator during the assembling or maintenance of cars. However, the grease composition according to the invention does not give such a feeling. In addition, a coloring agent can be added to provide a preferable color.

As a method of applying the grease composition, for example, about total 1 to 3 g of the grease composition is applied to the tooth surfaces of both the male shaft and the female shaft by an applying unit with a spline length of 30 mm to 50 mm and then the sliding may be allowed to become comfortable with overall.

Figure 3:
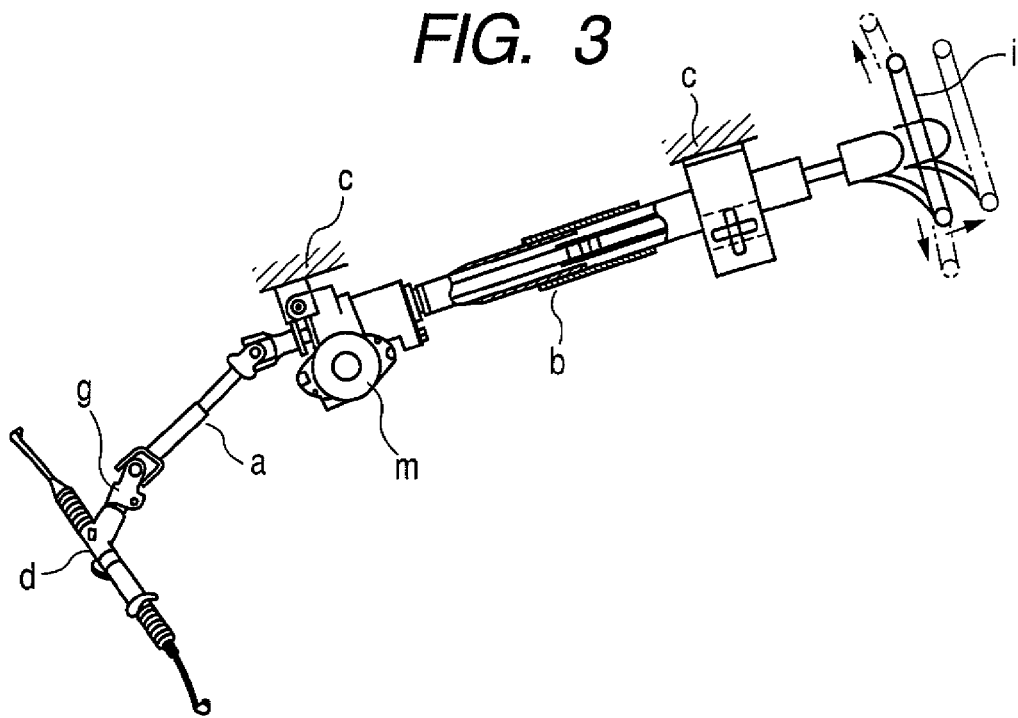
FIG. 3 is a side view illustrating an electric power steering in which the telescopic shaft is installed.

Further, the telescopic shaft according to the invention can be provided in an electric power steering. FIG. 3 is a side view illustrating an example of the electric power steering. The same references in FIG. 3 denote the same telescopic shaft and members as in FIG. 1 and a description thereof will be omitted. The electric power steering is a mechanism in which an electric motor "m" is interposed between the telescopic shafts "a" and "b" to assist steering manipulation and has an advantage in that controllability is more excellent and a mechanical part is more simple than a hydraulic power steering. In addition, in the hydraulic power steering, a hydraulic pump is always driven by an engine and the engine drives the hydraulic pump even during the straight-ahead driving which is not required to be assisted. However, in the electric power steering, the electric motor m is supplied with electric power only when it is necessary. Moreover, the electric power steering has an advantage in fuel consumption.

EXAMPLES

Hereinafter, the invention will be described with reference to test examples. However, the invention is not limited thereto.

As shown in Table 1, 12-hydroxy lithium stearate as a thickener was mixed with each of base oils having different kinetic viscosities, respectively so that the content of the mixed agent was 15 mass-% relative to the total amount of a grease. As a result, test greases A to F were prepared. Further, as shown in Table 2, 12-hydroxy lithium stearate as a thickener was mixed with a poly α-olefin oil (PAO) having a kinetic viscosity of 270 mm$^2$/s at 40° C. so that the mixed amounts are different as shown in Table 2. As a result, test greases G to L were prepared. As for each test greases, an apparent viscosity was measured at a shear rate of 10 sec$^{-1}$ and a temperature of 25° C. in accordance with JIS K2220. The measurement results are shown in Tables 1 and 2.

Further, a polytetrafluoroethylene coating was formed on the outer peripheral surface of a male spline, while keeping a female spline as it island thus a telescopic shaft was manufactured. Each of the test greases was enclosed in a gap between a male shaft and a female shaft of the telescopic shaft to provide a telescopic shaft for test. The telescopic shaft for test was provided for the following tests.

(1) Durability Test

As illustrated in FIG. 3, the telescopic shaft for test on the steering rack side was allowed to slide at a constant stroke and the steering wheel side was rotated 30,000 times alternately in a left-right direction at a constant cycle and a constant load. The rotation was carried out at a temperature of 80° C., which was maintained by a temperature control device disposed near the telescopic shaft for test. After the rotation 30,000 times, the steering wheel was rotated once again and at that time, the looseness in a rotation direction was evaluated by a hand feeling. Symbol "E" (excellent) denotes that the looseness was not felt, symbol "G" (good) denotes a level at which very small looseness occurred, but was not felt by a hand feeling, symbol "O" (O.K.) denotes a level at which small looseness was felt by a hand feeling and symbol "B" (bad) denotes a level at which large looseness was felt by a hand feeling. The results are shown in Tables 1 and 2.

(2) Slidability Test

Figure 4:
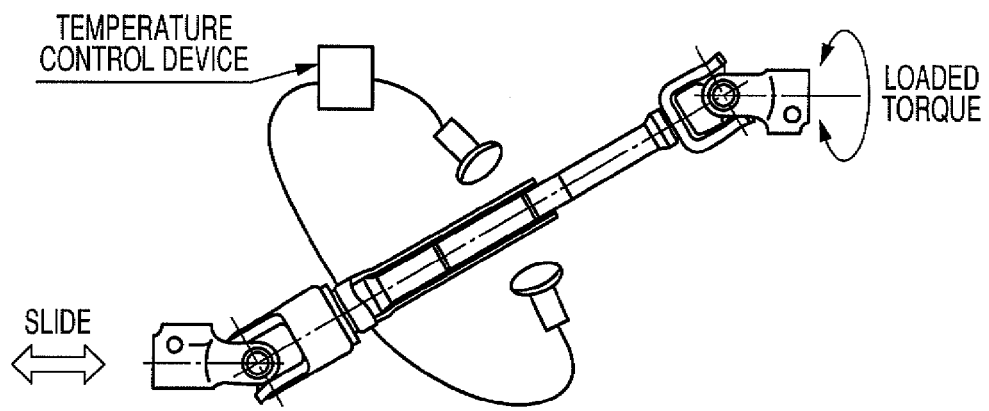
FIG. 4 is a view explaining a method for (1) Durability Test in Examples.

As illustrated in FIG. 4, the telescopic shaft for test was allowed to slide over the whole stroke range at a room temperature. At that time, a sliding force was evaluated. Symbol "E" denotes that a sliding force was very light, symbol "G" denotes that a sliding force was light, symbol "O" denotes that a sliding force was heavy and symbol "B" denotes a sliding force was very heavy. The results are shown in Tables 1 and 2.

(3) Stick-Slip Resistance Test

Figure 5:
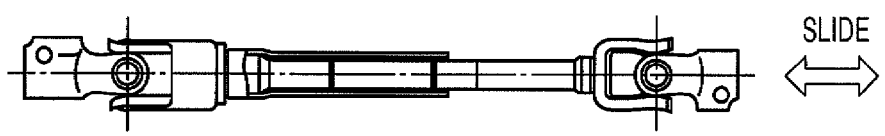
FIG. 5 is a view explaining a method for (2) Slidability Test in Examples.
Figure 6:
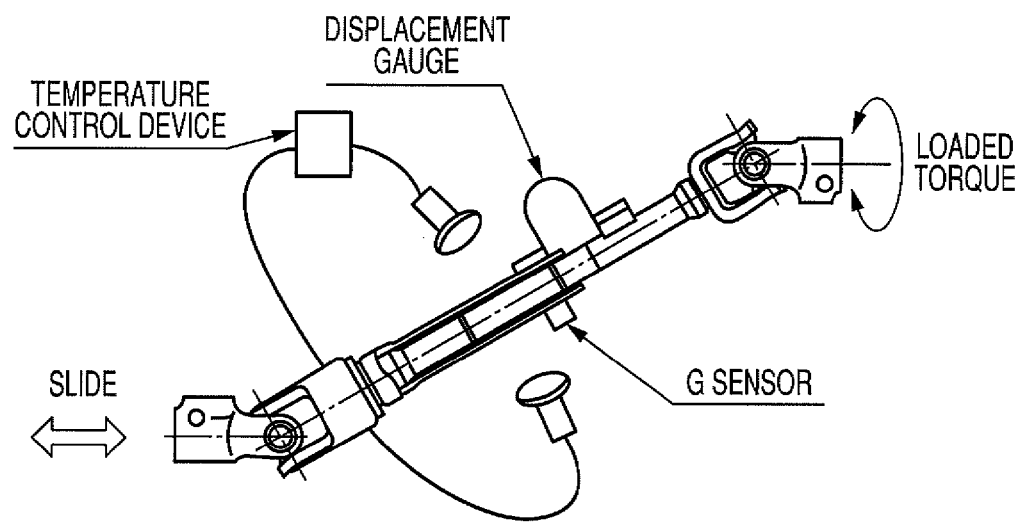
FIG. 6 is a view explaining a method for (3) Stick-SlipResistance Test in Examples.

As illustrated in FIG. 5, the telescopic shaft for test on the steering rack side was allowed to slide at a constant stroke and the steering wheel side was rotated alternately in a left-right direction at a constant cycle and a constant load. At that time, the stick-slip was evaluated. Temperature was maintained to 35° C. by the temperature control device disposed near the telescopic shaft for test. Further, by a displacement gauge mounted on the telescopic shaft for test, a G waveform was detected. Symbol 'E' denotes a level at which a very small waveform can be detected by the displacement gauge, symbol "G" denotes a level at which a small waveform was felt by a hand feeling, symbol "O" denotes a level at which a waveform was obviously felt by a hand feeling and symbol "B" denotes a level at which a large waveform was felt by a hand feeling. The results are shown in Tables 1 and 2.

TABLE 1

| | Kind of Base Oil | Kinetic Viscosity of Base Oil | Apparent Viscosity | Durability Test | Slidability Test | Stick-Slip Resistance Test |
|---|---|---|---|---|---|---|
| Grease A | PAO | 1652 | 1500 | E | B | O |
| Grease B | PAO | 1120 | 1050 | E | O | O |
| Grease C | PAO | 1050 | 720 | E | G | G |
| Grease D | PAO | 700 | 610 | E | G | G |
| Grease E | PAO | 270 | 500 | E | G | E |
| Grease F | PAO | 50 | 110 | O | E | O |

Note 1)
Unit of kinetic viscosity of base oil: mm$^2$/s at 40° C.
Note 2)
Apparent viscosity: measurement values at a shear rate of 10 sec$^{-1}$, 25° C., JIS K2220

TABLE 2

| | Mixed Amount of Thickener | Base Oil | Apparent Viscosity | Durability Test | Slidability Test | Stick-Slip Resistance Test |
|---|---|---|---|---|---|---|
| Grease G | 20 | PAO | 1020 | G | B | O |
| Grease H | 18 | PAO | 630 | E | G | G |
| Grease I | 15 | PAO | 500 | E | G | E |
| Grease J | 12 | PAO | 450 | E | G | G |
| Grease K | 10 | PAO | 410 | G | E | G |
| Grease L | 8 | PAO | 320 | O | E | O |

Note 1)
Apparent viscosity: measurement values at a shear rate of 10 sec$^{-1}$, 25° C., JIS K2220
Note 2)
A kinetic viscosity 270 mm$^2$/s (40° C.) is common to base oils.

In the tests, evaluations "E", "G" and "O" are acceptable levels. By enclosing the test grease satisfying the apparent viscosity, the kinetic viscosity of the base oil and the thickener, which are defined in the invention, friction is suppressed and thus the durability can be improved. In addition, reduction of friction can be realized and the stick-slip resistance can be improved. Particularly, when the apparent viscosity is ranging from 410 Pa·s to 720 Pa·s (25° C.), the kinetic viscosity of the base oil is ranging from 270 mm$^2$/s to 1050 mm$^2$/s (40° C.) and the amount of the thickener is ranging from 12 mass % to 18 mass %, a preferable result is obtained.

(4) Change in Sliding Force Depending on Temperature

Figure 7:
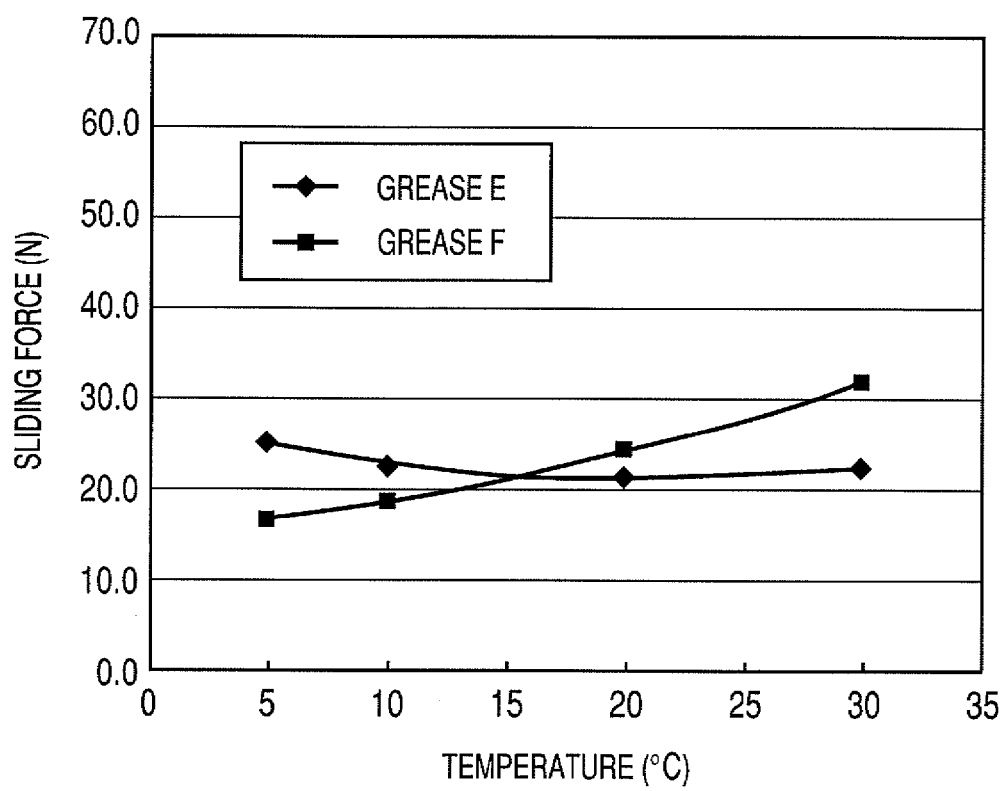
FIG. 7 is a graph illustrating measurement results of (4) Change in Sliding Force depending on Temperature in Examples.

In order to verify changes in sliding force depending on an atmosphere temperature during the assembling, the greases E and F were used and the sliding force was measured at external temperatures of 5° C., 10° C., 20° C. and 30° C. The results are shown in Table 3 and FIG. 7.

TABLE 3

|  | 5° C. | 10° C. | 20° C. | 30° C. |
|---|---|---|---|---|
| Grease E | 25.0 N | 22.0 N | 21.5 N | 22.3 N |
| Grease F | 16.6 N | 18.6 N | 24.0 N | 31.3 N |

In the case of the grease E according to the invention, variation in sliding force in accordance with a temperature is ranging from about 3 N to 3.5 N. On the other hand, in the case of the grease F, variation in sliding force is twice the above range, that is ranging from about 7 N to 15 N. Accordingly, it was confirmed that the grease composition according to the invention was more advantageous. Further, it was confirmed that in the case of the grease composition E according to the invention, the sliding force is difficult to change depending on a temperature.

JIS K2220

Japanese Industrial Standard K2220 is referenced above. A copy of JIS K2220 is provided below, along with a translation following the translation.
FIG. 40 Grease cup (an example)
  Unit: mm
  Approx. drilled
    Approx.
    Approx.
      Approx.
  Approx. x approx. groove Approx. Approx.
    Approx.
Information This figure has been drawn based on FIG. 5 of ASTM D 1472-91.
19. Apparent viscosity test method
19.1 Principle of test Grease in a cylinder is hydraulically extruded through a capillary-tube. Pressure generated in a system at that time is measured. An apparent viscosity is calculated from a preliminarily obtained flow-rate, the radius and the length of the capillary-tube, and the measured pressure, using Poiseuille's formula prescribed in 19.6. This test method is applicable to the measurement of the apparent viscosity in a range from 2.5 Pa·s to 10000 Pa·s at a slip rate (shear rate) of 0.1 s$^{-1}$ and in a range from 0.1 Pa·s to 10 Pa·s at a slip rate (shear rate) of 15000 s$^{-1}$ in a temperature range from −55° C. to 40° C.
19.2 Test Apparatus An apparent viscosity testing machine consists of the following systems a) to e). FIG. 41 shows an example of the apparent viscosity testing machine.

Remarks: When a test is performed at a temperature other than room temperature, the test is performed by placing a grease system [Fig. 41b)] in a thermostat liquid bath or air bath, capable of maintaining the grease system at the test temperature ±0.5° C.
FIG. 41 a) Apparent viscosity testing machine (an example)
(1) Induction motor
(2) Reduction gear
(3) Flow-rate changing gear (having 40 teeth or 64 teeth)
(4) Driving gear (having 42 teeth)
(5) Gear pump
(6) Hydraulic system piping (b)
(7) Pressure gauge
(8) Return valve
(9) Grease cylinder
(10) Hydraulic oil receiver
(11) Capillary-tube
(12) Temperature sensing element (a thermocouple, a thermistor etc.)
(13) Sample (grease)
(14) Piston
(15) Hydraulic oil
(16) end cap A
(17) end cap B
(18) Needle valve mounting position
(19) Hydraulic oil changing cylinder
(20) Hydraulic system piping (a)
Information: This figure has been drawn based on FIG. 2 of ASTM D 1092-99.
FIG. 41b) Apparent viscosity testing machine (an example)
Hydraulic system (b)
  Grease system
  (7) Pressure gauges (manifold type mounting)
  Hydraulic system (a)
  Power system
Information: This figure has been drawn based on FIG. 1 of ASTM D 1092-99.
a) Power system A power system consists of an approx. 200-W induction motor, an appropriate reduction gear, and a flow-rate changing gear. Two gears respectively having 40 teeth and 64 teeth are used as the flow-rate changing gear by being replaced with each other.
b) Hydraulic System (a)

A hydraulic system (a) consists of a gear pump, a driving gear having 42 teeth, and a hydraulic system piping (a).
  1) Gear Pump A gear pump is a constant-volume gear pump with small discharge rate change and without pulsating-flow against variation of discharge pressure. The flow-rate of the gear pump can be changed to approximately 4.8 ml/min and to approximately 7.6 ml/min, using the flow-rate changing gears respectively having 40 teeth and 64 teeth.

Remarks: The discharge rate of the gear pump is equivalent to 0.584 ml/rev., or 1.168 ml/rev. The hydraulic oil having a viscosity of approximately 2000 mm$^2$/s at test room temperature is used.

2) Hydraulic system piping (a) A hydraulic system piping (a) is a piping for applying hydraulic pressure to a grease cylinder from a hydraulic apparatus via a hydraulic oil changing cylinder through a hydraulic system (b), and equipped with a return valve. The hydraulic system piping is a piping path that allows no leakage to occur at a hydraulic pressure of 27.5 MPa, and that allows no gas bubbles to remain in the system.
c) Hydraulic System (b)

A hydraulic system (b) consists of a hydraulic piping (b) and a pressure gauge branch pipe.
  1) Hydraulic system piping (b)

The hydraulic piping (b) receives pressure from the hydraulic system piping (a) and applies pressure to the grease cylinder via the hydraulic oil changing cylinder. The hydraulic system piping (b) is a piping path that allows no leakage to occur at a hydraulic pressure of 27.5 MPa, and that allows no air bubble to remains in the system.

Remarks: The hydraulic oil whose viscosity is equal to or lower than 2000 mm$^2$/s at test room temperature is used.

2) Pressure gauge branch pipe

Either of a type of attaching a pressure gauge to a pressure gauge branch pipe of the hydraulic system piping (b) at a single place, as shown in FIG. 41a), or another type of respectively attaching pressure gauges to the pressure gauge branch pipes of a manifold type hydraulic system piping (b), as shown in FIG. 41b), can be employed. However, in the case of attaching each pressure gauge to an associated pressure gauge branch pipe of the manifold type hydraulic system piping (b), a switching valve is provided in each branch pipe.

3) Pressure Gauge

A pressure gauge, whose grade prescribed in JIS B 7505 is equal to or higher than 1.6, is used. For example, a pressure gauge for pressure in a range from 0 MPa to 0.4 MPa, 0 MPa to 1 MPa, 0 MPa to 4 MPa, or 0 MPa to 25 MPa is provided in the system.

Remarks: The pressure gauge is used at a pressure equal to or less than ⅔ the maximum pressure indicated.

d) Grease System

A grease system consists of a grease cylinder portion and a capillary-tube.

1) Grease Cylinder Portion

FIG. 42 illustrates an example of the grease cylinder portion that can withstand a dynamic pressure of 27.5 MPa. A piston adapted to cause, when moved in the cylinder, no appreciable friction is used. The end cap A [Fig. 41b)]capable of being connected to the hydraulic system piping is used. The end cap B [Fig. 41b)] provided with a capillary-tube or a temperature sensing element is used.

Remarks: The values of the inside diameter dimension of the cylinder and the outside diameter dimension of the piston, which are shown in the figure, are standard ones and can differ somewhat from the standard values, Incidentally, the clearance between the inside diameter of the cylinder and the outside diameter of the piston ranges from 0.012 mm to 0.063 mm. A gasket is configured to have a gasket fastening structure adapted using a copper gasket, a synthetic rubber O-ring so that no leakage occurs under a testing hydraulic pressure during test.

Incidentally, the fastening of the gasket can be cap-nut-fastening.

FIG. 42 Grease cylinder portion (an example)
Unit: mm
End cap B
End cap A Copper gasket
Approx. Ridge thread
Welded before machining
PS thread
(Temperature sensing element mounting thread)
Outside diameter ground
Internal surface ground
PT thread
Outside diameter approx. Seamless steel pipe
PS thread
(Capillary-tube mounting thread)
Approx. Approx.
Approx.
Approx.
Information: This figure has been drawn based on Fig. A1.1 of ASTM D 1092-99

2) Capillary-tube

FIG. 43 illustrates an example of a capillary-tube. Eight types of capillary-tubes differing in inside diameter from one another configure a set. The diameter of each capillary-tube is substantially equal to a dimension illustrated in FIG. 43. The length of each capillary-tube is 40 times the actually measured diameter ±0.02 mm.

e) Thermometer

A thermometer can measure the temperature of a sample in the grease cylinder, and can fix the temperature sensing element, such as a thermocouple and a thermistor, to the end cap B of the grease cylinder.

19.3 Calibration a) Calibration of Flow of Hydraulic System

Fill the hydraulic system (a) [see FIG. 41b)] with hydraulic oil having a viscosity of approx. 2000 mm$^2$/s at test room temperature. Next, dismount the grease cylinder which has been mounted in the hydraulic system (b) [see FIG. 41b)], while fixing a needle valve [Fig. 41b) (18)] thereto.

b) Fill the hydraulic system (b) with hydraulic oil having a viscosity of equal to or lower than 2000 mm$^2$/s at test room temperature, and expel air-bubbles therefrom. Maintain the hydraulic system (b) illustrated in FIG. 41b) at a test temperature. Operate the pump under a pressure of 0 MPa. Quickly place a hydraulic pump flow correction receiver under a discharge port. Simultaneously, push a stopwatch. Measure a time needed to flow out 60 ml of the hydraulic oil. Then, calculate a flow (cm$^3$/s). Next, continue the measurement of the flow-rate under a pressure of 2.9 MPa, 6.9 MPa, 9.8 MPa, and a value higher than 9.8 MPa by adjusting the needle valve. Then, draw a calibration curve as illustrated in FIG. 44. This curve is used for the calibration of the flow-rate when measuring that of the sample. The calibration of this hydraulic system can be performed by measuring the flow of grease used in a test. Because the flow-rate changes due to the abrasion of the pump, repeat the calibration at a constant interval of an operating period.

FIG. 43 Capillary-tube (an example)
Stainless seamless steel pipe
PS thread
Hexagonal nut
40×A(an actually measured value of a diameter)=B(a length)±0.02 mm

| Tube No. | Diameter (approximate Value) mm |
|---|---|
| 1 | 3.80 |
| 2 | 2.40 |
| 3 | 1.85 |
| 4 | 1.50 |
| 5 | 1.20 |
| 6 | 1.00 |
| 7 | 0.65 |
| 8 | 0.45 |

Information: This figure has been made based on Fig. A1.2 of ASTM D 1092-99

FIG. 44 Pump flow-rate calibration curve (an example)
Flow-rate variation
Pressure
Information: This graph has been made based on FIG. 3 of ASTM D 1092-99 c) Calibration of capillary-tube

Measure the length (cm) of the capillary-tube to a decimal place of 0.001 cm, using a micrometer. In order to measure the inside diameter of a capillary-tube, erect the capillary-tube vertically on the one end sealed and fill the inside of the capillary-tube with mercury. Transfer the mercury out of the capillary-tube into a weighing bottle whose weight is already known. Weigh the mass (mg) of the mercury to a decimal place of 1 mg. Calculate the capacity of the bottle by dividing the mass of the mercury by the density of the mercury at a measuring temperature. Next, calculate the radidus (cm) of the capillary-tube, and round off the calculated radius at a rounding-off width of 0.001 according to a rule of JIS Z 8401. Incidentally, perform the calibration of a capillary-tube having a minute radius as follows according to a procedure prescribed in 19.5. That is, measure the pressure of oil having a known viscosity, instead of grease. Calculate the radius (cm) of the capillary-tube by the following formula. Round off the calculated radius at a rounding-off width of 0.001according to the rule of JIS Z 8401.

where R: radius (cm) of the capillary-tube

L: length (cm) of the capillary-tube

η: viscosity (Pa·s) of oil used at the test temperature v/t: flow-rate (cm³/s) of the pump P: reading (MPa) on the pressure gauge.

19.4 Sampling Method and Sample Preparation Method

A sample is taken and prepared by a primary sample sampling method and a secondary sample preparing method prescribed according to JIS K 2251, or methods conforming to the prescribed methods.

19.5 Test Procedures

A test procedure is given as follows [see FIG. 41b)].

a) Fill each of the hydraulic system (a) and the hydraulic system (b) with hydraulic oil prescribed with careful attention to prevent air bubbles from being entrained into the oil.

b) Prepare a sample of 0.3 kg or more.

c) Fill the grease cylinder with the sample with careful attention to prevent bubbles from being entrained thereinto. After the piston is fit to the side of the end cap A of the grease cylinder, attach the end cap A, the end cap B, and the No. 1 capillary-tube to the grease cylinder.

d) Connect the end cap A to the hydraulic system (b) while filling a connection portion with the hydraulic oil.

e) Open the return valve, and activate the pump to circulate hydraulic oil and to expel air in the hydraulic system. Then, stop the pump, and close the return valve.

f) Measure the temperature of the sample with a thermocouple, a thermistor or the like inserted into the end cap B, and adjust the temperature of the sample to the test temperature ±0.5° C. ([29])

Note ([29]): Time needed by the sample to reach the test temperature is two hours in the case of using the liquid bath, or eight hours in the case of using the air bath, e.g., if the test temperature is −50° C.

g) After the specimen reaches the test temperature, connect the flow-rate changing gear having 40 teeth, and activate the pump. When the pressure in the hydraulic system reaches an equilibrium pressure, record this pressure. Next, replace the flow-rate changing gear with a flow-rate changing gear having 64 teeth, and again, obtain an equilibrium pressure. Then, record this pressure, and open the return valve. Release the internal pressure of the system. Replace the No. 1capillary-tube with a No. 2 capillary-tube. Then, repeat the above operation. Similarly, obtain equilibrium pressures at the two flow-rates, respectively, corresponding to each capillary-tube. Then, record the obtained pressures.

19.6 Calculation Method and Accuracy a) Calculation Method

Calculate the apparent viscosity of grease by the following formula. Round off the calculated apparent viscosity to three significant digits. An example of such calculation is shown in Table 23.

where η: apparent viscosity (Pa·s)

F: slip stress (shear stress) (N/m²)

S: slip rate (shear rate) (s⁻¹)

Thus, where P: reading (MPa) on the pressure gauge;

R: radius (cm) of the capillary-tube;

L: length (cm) of the capillary-tube;

v/t: flow-rate (cm³/s).

b) Accuracy is not prescribed.

TABLE 23

Example of Calculation Table for Apparent Viscosity
Sample: grease A Test temperature: 25° C.

| Capillary-tube | The number of the teeth of Flow-rate Changing Gears | Reading of Pressure Gauge (MPa) | Apparent Viscosity | Slip Rate ([30]) | Slip Stress |
|---|---|---|---|---|---|
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 1 | | | | | |
| 2 | | | | | |
| 3 | | | | | |
| 4 | | | | | |
| 5 | | | | | |
| 6 | | | | | |
| 7 | | | | | |
| 8 | | | | | |

Note
([30]) Slip rates described in this column have preliminarily been obtained by calculation.
Information: This table is made based on Table 1 of ASTM D 1092-99 c) The slip rate is calculated by the following formula.

Remarks: Sixteen values of the slip rate can be obtained by calculation, using eight types of capillary-tubes and two flow-rates corresponding to each type of the capillary-tube.

d) An apparent-viscosity-versus-slip-rate curve is drawn on a double logarithmic graph paper illustrated in FIG. 45. An apparent viscosity at a prescribed slip rate is obtained from this graph.

FIG. 45 Example of apparent-viscosity-versus-slip-rate curve

Apparent viscosity versus slip rate

Sample: grease A

Temperature: 25° C.

Apparent viscosity

Slip rate

Information: This graph has been made based on FIG. 4 of ASTM D 1092-99.

19.7 Method for Measuring Apparent Viscosity at Low Slip Rate a) Equipment

Equipment shall be based on 19.2. Incidentally, a No. 0 capillary-tube ([31]) is used as the capillary-tube.

Note ([31]): Dimensions of the No. 0 capillary-tube:

Diameter: 9.525 mm±0.025 mm

Length: 381.000 mm±0.025 mm

Remarks: Because pressure is low during the measurement at a low slip rate, the sufficient verification of the equipment should be performed to make the operating condition of the equipment better and to reduce an error.

b) Test Procedures

A test procedure shall be based on 19.5.

Information; In the case of the measurement of the slip rate that is equal to or less than 1 s⁻¹, it is better to use a pump capable of changing a flow-rate.

c) Calculation Method and Accuracy

A calculation method and accuracy shall be based on 19.6.

19.8 Report of Calculation Result

A report of a calculation result shall describe the following items.

a) Sample name, a sampling place, and a sampling date b) Designation of a test method and a result obtained according to 19.6 c) Test date d) Specially described matters

20. Timken Method of Load-Carrying Capacity Test
20.1 Principle of Test

A set load is applied to a sample while the sample is supplied at a constant rate to between a test cup and a test block. After a testing machine is driven at a prescribed rotating speed for a prescribed time, an OK-value and a score value are obtained from the condition of a wear track on the test block.

Remarks: This test method specifies necessary-items needed in the case of measuring the load-carrying capacity of grease by the Timken method prescribed in JIS K 2519 5. The definitions of terms and the outline of the test equipment and the test procedure shall be based on JIS K 2519.

The invention claimed is:

1. A telescopic shaft for vehicle steering which is installed in a vehicle steering shaft and in which a male shaft and a female shaft are non-rotatably and slidably fitted to each other and an outer peripheral portion of the male shaft and an inner peripheral portion of the female shaft come in contact with each other to transmit a torque during rotation,
   wherein a grease composition which has an apparent viscosity of 400 Pa·s to 750 Pa·s 25° C.) at a shear rate of 10 sec$^{-1}$ as measured in accordance with JIS K2220 is enclosed in a gap between the outer peripheral portion of the male shaft and the inner peripheral portion of the female shaft,
   wherein the grease composition includes a base oil and a thickener,
   wherein the base oil is a synthetic hydrocarbon oil,
   wherein the thickener is at least one of a lithium-based soap and a lithium complex-based soap, and
   wherein the content of the thickener is in a range from 5 mass % to 35 mass % relative to a total amount of the grease.

2. The telescopic shaft for vehicle steering according to claim 1,
   wherein a resin coating is formed on at least a part of a sliding surface of at least one of the male shaft and the female shaft.

3. The telescopic shaft for vehicle steering according to claim 1,
   wherein a kinetic viscosity of a base oil of the grease composition is ranging from 200 mm$^2$/s to 1100 mm$^2$/s (40° C).

4. A grease composition which is enclosed in a gap between an outer peripheral portion of a male shaft and an inner peripheral portion of a female shaft of a telescopic shaft for vehicle steering which is installed in a vehicle steering shaft and in which the male shaft and the female shaft are non-rotatably and slidably fitted to each other and the outer peripheral portion of the male shaft and the inner peripheral portion of the female shaft come in contact with each other to transmit a torque during rotation,
   wherein in a base oil which has a kinetic viscosity of 200 mm$^2$/s to 1100 mm$^2$/s at 40° C., a thickener is mixed at a ratio of 5 mass % to 35 mass % relative to a total amount of the grease and an apparent viscosity is ranging from 400 Pa·s to 750 Pa·s (25° C.) at a shear rate of 10 sec$^{-1}$ as measured in accordance with JIS K2220,
   wherein the base oil is a synthetic hydrocarbon oil, and
   wherein the thickener is at least one of a lithium-based soap and a lithium complex-based soap.

* * * * *